United States Patent Office 3,345,199
Patented Oct. 3, 1967

3,345,199
DECORATING COMPOSITION AND METHOD
FOR DECORATING THEREWITH
Howard M. Fitch, Summit, N.J., assignor to Engelhard Industries, Inc., Newark, N.J., a corporation of Delaware
No Drawing. Filed Aug. 16, 1963, Ser. No. 302,704
8 Claims. (Cl. 117—46)

This invention relates to precious metal decorating compositions and more particularly to decorating compositions containing silver neocarboxylates, method of decorating with such compositions and to novel silver alkyl neocarboxylates especially well suited for use in such compositions.

Decorating compositions containing silver in the form of silver sulforesinates have been known for many years. The silver sulforesinates are prepared as described, for example, by Zsigmondy, U.S. Patent 682,310, and by Chemnitius, Sprechsaal, 60, 313 (1927), by reacting a silver salt with a sulfurized terpene such as sulfurized Venetian turpentine. They are prepared from natural products that are in variable supply and of variable composition, and they vary in composition and properties depending upon the source of the terpene from which they are made and the extent and conditions of sulfurization. This variability is a distinct disadvantage leading to unpredictable behavior during their preparation and after their incorporation into decorating compositions. Even when prepared by experienced personnel under carefully controlled conditions, yields as high as 90 percent are exceptional and at times the yield falls to 60 percent or lower for no apparent reason. This means that from 10 to 40 percent of the silver used in the reaction does not appear in the product and must be recovered from the washings and residue, thus materially increasing the cost of preparing the product. Moreover, the silver sulforesinates have very limited solubility in many decorating vehicles, severely limiting the choice of vehicles and the amount of silver that can be incorporated into the decorating composition. Further, these silver sulforesinate-containing decorating compositions require firing at relatively high temperatures, and because of the high firing temperatures it is not possible to obtain a specular silver film useful as a mirror. The metallic films obtained by the high temperature firing are dull and matte in appearance, which is apparently due to either formation of silver oxides or sintering of the metallic film. When decorating glass substrates, there is also a tendency for the silver to migrate into the interior of the glass substrate and be lost at the high temperatures of the firing.

In accordance with the present invention, novel precious metal decorating compositions are provided which are a considerable improvement over the silver sulforesinate-containing decorating compositions of the prior art. The decorating compositions of this invention comprise a silver neocarboxylate and an organic decorating vehicle. They may also contain a flux and/or other precious metals. Silver neocarboxylates are silver compounds wherein a tertiary carbon atom is bonded to the carboxylate radical. They have the general formula

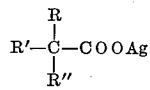

wherein R, R' and R" are alkyl, aryl, alkaryl or aralkyl radicals. In contrast to the silver sulforesinates, silver neocarboxylates are of known and reproducible composition, giving decorating compositions that do not vary from lot to lot, and they may be readily prepared in high yields with minimal loss of reagents and expense of recovering unreacted silver. The decorating compositions of this invention develop a metallic film on firing at remarkably low temperatures. This low firing characteristic is particularly advantageous when the compositions are used on glass substrates, since no appreciable migration of silver into the glass occurs and the glass substrate need not be heated to the point of thermal strain, eliminating the need for costly annealing procedures. Certain of the silver neocarboxylates hereinafter disclosed have a very high solubility in a wide range of organic decorating vehicles, permitting a wide choice of vehicles and the preparation of liquid decorating compositions with a high silver content. The combination of high solubility and low firing temperature permits the formation of decorating compositions that fire to specular metallic films useful as mirrors.

Silver neocarboxylates are prepared by causing an alkali metal or ammonium salt of a neocarboxylic acid to react with a silver salt such as silver nitrate. The more soluble silver neocarboxylates may also be prepared by reacting a neocarboxylic acid with silver oxide, preferably in a solvent such as toluene. Alternatively, they may be prepared by the reaction of a neocarboxylic acid with a silver lower alkanoate, such as silver acetate, with heating to remove the lower alkanoic acid liberated in the reaction. Typical preparations of silver neocarboxylates are given in Examples 1 and 2 hereinafter set forth. Pure neocarboxylic acids are not essential to the practice of this invention, and mixtures of neocarboxylic acids may be employed to give mixtures of silver neocarboxylates that are suitable for use as ingredients of the decorating compositions of this invention.

Many of the silver neocarboxylates have low solubility in organic decorating vehicles and can only be employed as suspensions or pastes to give decorating compositions that fire to matte dull films having little decorative appeal. Such films are useful as conductors of electricity and for other purposes and they can be burnished to give bright films with the soft luster characteristic of polished silver. Their decorative use is limited however, due to the cost of burnishing, which requires much hand labor, and to the fact that the reverse side of the film, which cannot be burnished, remains dull and unattractive. A high solubility in organic decorating vehicles is required to obtain decorating compositions that fire to bright, specular metallic films useful as mirrors and for their decorative appeal without burnishing. It has now been found that silver alkyl neocarboxylates, i.e. compounds of the general formula previously disclosed herein and wherein R, R' and R" are each alkyl radicals and containing 10 or more carbon atoms have a remarkably high solubility in organic decorating vehicles and give liquid decorating compositions that fire to bright, specular metallic films. This finding was quite unexpected, since increasing the number of carbon atoms ordinarily results in only minor increases in the solubility of silver carboxylates. Silver stearate containing 18 carbon atoms, for example, is soluble only to the extent of about 0.004 percent by weight in toluene at room temperature. Moreover, additional carbon atoms in the form of aryl radicals effect little improvement in solubility. Silver triphenylacetate containing 20 carbon atoms, for example, is soluble only to the extent of about 0.006 percent by weight in toluene at room temperature. It would appear the very remarkable solubility of silver alkyl neocarboxylates containing 10 or more carbon atoms is due to the combination of the tertiary carbon with only alkyl radicals bonded thereto and bonded to the carboxy carbon and a number of non-aromatic carbon atoms of not less than 10 per molecule. The solubilities of silver alkyl neocarboxylates in toluene, a typical ingredient of organic decorating vehicles, at room temperature are listed in Table I. It may be seen hat while the increase in solubility in going from 5 to 8 carbon atoms is relatively small and is larger at 9 carbon atoms although still not sufficiently soluble at 9 carbons to provide liquid decorating compositions that fire to specular metallic films, the solubility is very much greater at 10 carbon atoms than at 9 with a sufficiently high solubility beginning at 10 carbon atoms for the formation of liquid decorating compositions that fire to specular metallic films. For the aforesaid reasons, silver alkyl neocarboxylates containing 10 or more carbon atoms per molecule and having the formula

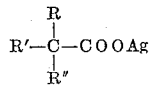

wherein R, R' and R" are alkyl radicals are preferred as ingredients in the decorating compositions of this invention. While the range of organic decorating vehicles in which silver alkyl neocarboxylates have high solubility broadens as the number of carbon atoms is increased, the silver content of the silver alkyl neocarboxylates decreases with increased number of carbon atoms. Thus it is generally not advantageous to employ more than 40 carbon atoms per molecule. The optimum number is from 13 to 20 carbon atoms and silver alkyl neocarboxylates containing from 13 to 20 carbon atoms and having the above formula are especially preferred. For most applications, silver neotridecanoate combines a high silver content with adequate solubility and is especially preferred.

Silver neocarboxylates of low solubility suitable for incorporation in pastes and suspensions to give decorating compositions that fire to matte films requiring burnishing include, for example, silver salts of the following acids: Trimethylacetic acid, 2,2-dimethylpropionic acid, 2,2-diethylpropionic acid, 2,2-dimethylbutyric acid, 2,2-dimethylpentanoic acid, 2,2,3,3-tetramethylpropionic acid, triethylacetic acid, 2,2,3,3-tetramethylbutyric acid, 2-methyl-2-ethylpentanoic acid, 2-methyl-2-ethylheptanoic acid, alpha,alpha-dimethylphenylacetic acid, alpha,alpha-dimethyl-beta-phenylpropionic acid, 2,2-diphenylpropionic acid, 2,2-diphenylbutyric acid, 2-phenyl-2-benzylpropionic acid, 2,2-diphenylpentanoic acid, 2,2-di(p-methylphenyl)-propionic acid, 2,2-dimethyl-3,4-diphenylbutyric acid, 2,2-di(o,p-dimethylphenyl)propionic acid, 2,2-diphenylheptanoic acid, triphenylacetic acid, 2,2,3-triphenylpropionic acid, alpha,alpha-diphenyl - p - methylphenylacetic acid, alpha,alpha-dibenzylphenylacetic acid, 2,2-di(p-methylphenyl)-3-phenylpropionic acid and 2,2 - diphenyl-4-phenyl-4-methylpentanoic acid. Generally speaking, the silver alkyl neocarboxylates fire at somewhat lower temperatures than silver neocarboxylates containing aryl radicals and are preferred for this reason.

Preferred silver alkyl neocarboxylates of high solubility suitable for incorpoation in liquid decorating compositions that fire to specular metallic films include, for example, silver salts of the following acids: 2,2-dimethyloctanoic acid, 2-butyl-2-methylhexanoic acid, 2-isobutyl-2-methylhexanoic acid, 2,2-dimethylnonanoic acid, 2-tert.-butyl-2,4,4-trimethylpentanoic acid, 2-butyl-2-methyloctanoic acid, 2,2-dimethylundecanoic acid, 2-butyl-2-ethyldecanoic acid, 2-octyl-2-methyldecanoic acid, 2,2-dimethyloctadecanoic acid, 2-butyl-2-heptylnonanoic acid, 2,2-dimethylnonadecanoic acid, 2-ethyl-2-methyleicosanoic acid, 2,2-diethyloctadecanoic acid, 2,2,17,17-tetramethyloctadecanoic acid, 2-heptyl-2-methylhexadecanoic acid, 2-ethyl-2-nonyltetradecanoic acid, 2-decyl-2-methyltetradecanoic acid, 2-decyl-2-ethyltetradecanoic acid, 2-undecyl-2-methyltetradecanoic acid, tripropylacetic acid, triamylacetic acid, 2,2-diamylhexanoic acid and 2,2-diheptylhexanoic acid.

The silver sulforesinates previously used in decorating compositions require relatively high temperatures to form a metallic film, limiting their application to the decoration of relatively refractory materials such as glass, ceramics, metals, quartz, mica and other materials that are not damaged by the high temperature required. It is an outstanding and unexpected advantage of the decorating compositions of this invention containing silver neocarboxylates that they fire to a metallic film at relatively low temperatures of the order of 110° C. extending their application to a wide range of plastics, plastic laminates, wood, paper, textiles, leather and the like that would be damaged by high temperatures. A roughly quantitative estimate of the firing temperatures required was made by brushing solutions or suspensions of silver neocarboxylates in toluene onto glass slides. After evaporation of most of the toluene, the slides were heated for one hour in a precisely controlled mechanical convection oven, and the films obtained were tested for electrical conductivity. The tests were repeated at temperature intervals of 5° C. to determine within 5° C. the minimum firing temperature (MFT) required to produce conductivity showing the formation of a continuous film of metallic silver on the slide. It will be recognized that firing would ordinarily be conducted at a higher temperature or for a longer period of time in order to obtain maximum conductivity and brilliance of the film. Nevertheless, the minimum firing temperatures obtained in this manner give a reproducible index of the relative temperatures required for practical decorating compositions. The results of these tests for typical silver alkyl neocarboxylates are given in Table I. It may be seen that these compounds fire at very low temperatures. Under the same conditions, temperatures in excess of 300° C. are required to obtain conductive films from the silver sulforesinates of the prior art. It should be emphasized that a combination of high solubility and low firing temperature is required to obtain specular silver films, and it was unexpected and surprising that such combination of properties permitting the formation of specular silver films, after firing, were attained by decorating compositions of this invention containing the preferred silver alkyl neocarboxylates containing from 10 to 40 carbon atoms.

TABLE I.—PROPERTIES OF TYPICAL SILVER ALKYL NEOCARBOXYLATES

| Number of carbon atoms per molecule | Silver alkyl neocarboxylate | Solubility [1] | MFT [2] |
|---|---|---|---|
| 5 | $CH_3C(CH_3)_2COOAg$ | 0.063 | 135 |
| 6 | $C_2H_5C(CH_3)_2COOAg$ | 0.25 | 135 |
| 7 | $C_3H_7C(CH_3)_2COOAg$ | 0.33 | 120 |
| 8 | $(C_2H_5)_3CCOOAg$ | 0.43 | 120 |
| 9 | $C_4H_9C(CH_3)(C_2H_5)COOAg$ | 15.7 | 120 |
| 10 | $C_6H_{13}C(CH_3)_2COOAg$ | ([3]) | 120 |
| 13 | $C_9H_{19}C(CH_3)_2COOAg$ | ([4]) | 110 |

[1] Solubility as percent by weight in toluene at room temperature.
[2] Minimum firing temperature in ° C. required to give a conductive metallic film in one hour.
[3] Greater than 60.
[4] Miscible in all proportions.

While the decorative effect is an outstanding property of the film of metal produced from the decorating compositions of this invention, these films inherently possess other useful properties such as a high degree of reflectivity to light, making them useful as reflectors and mirrors, and reflectivity to infra-red radiation, making them useful as reflectors for lamps, ovens and the like and to protect materials exposed to high temperatures; electrical conductivity, making them useful in forming printed circuits, resistors and capacitors and as bases for soldering connections to non-conductive materials, for electroplating and plating by dipping in molten metals and alloys; and mechanical strength, making them useful in forming vacuum tight glass to metal seals and the like. In speaking of decorating and decorating compositions, it is intended to include the other useful properties inherent in the metal films produced.

The organic decorating vehicle of this invention, with which the silver neocarboxylate is combined in preparing the decorating compositions is also an important part of this invention. It is to be understood that this decorating vehicle is not simply a single solvent or diluent but instead a mixture of two or more of the materials hereafter disclosed. Use of a single vehicle or solvent tends to be disadvantageous from the standpoint of not depositing a satisfactory metallic film on the article being decorated. In a composition to be applied by brushing, for example, it is virtually impossible to obtain with a single solvent the properties of smooth flow from the brush, leveling, non-running and the like that are essential to the deposit of an even film having sharp boundaries. Similarly, in a composition to be applied by screen printing, the use of a single solvent of high volatility, for instance chloroform, tends to cause clogging of the screen due to premature volatilization of the solvent during screening, while the use of a single solvent of low volatility, for instance cyclohexanone, tends to cause smearing and running of the applied design due to the very slow evaporation of solvent from the film after screening. A single solvent of intermediate volatility tends to clog the screen and also smear and run, and a satisfactory vehicle can only be obtained with a mixture of two and preferably more components. Moreover, with a single solvent having a fixed boiling point, there is a tendency for the solvent to boil suddenly when the boiling point is reached during the firing cycle, causing eruptive pitting and blistering of the film. This tendency is minimized by using mixtures of solvents having a range of boiling points. Essential oils are particularly suitable for use in organic decorating vehicles, since, in addition to their other desirable physical properties, they are inherently mixtures of components having a range of boiling points. The choice of the particular organic decorating vehicle utilized controls the behavior of the composition before firing and is dictated by the method by which the composition is to be applied. The particular ingredients selected are carefully chosen to impart specific physical properties to the composition. The properties, such as oiliness, viscosity, evaporation rate, surface tension and tack will vary for different methods of application such as, for instance, brushing, spraying, stippling, stamping, printing, both direct and offset, hot or cold screen printing, stenciling and decalcomania transfer. The organic decorating vehicle will include mixtures of two or more of the following ingredients, for example: ketones such as for instance methyl ethyl ketone and cyclohexanone, esters such as for instance ethyl acetate, amyl acetate, benzyl acetate, butyl oxalate, dibutyl itaconate, benzyl benzoate, dibutyl phthalate and butyl carbitol acetate, ethers such as for instance dioxane, Cellosolve and dipentene oxide, alcohols such as for instance butanol and cyclohexanol, hydrocarbons and halogeno and nitro substituted hydrocarbons such as for instance toluene, xylene, petroleum ether, mineral spirits, chloroform, carbon tetrachloride and nitrobenzene, aliphatic acids such as for instance myristic acid, oleic acid and stearic acid, amides such as for instance the primary amides of higher fatty acids, terpenes such as for instance pinene and terpineol, essential oils such as for instance oils of lavender, rosemary, aniseed, sassafras, wintergreen, fennel, pine, peppermint, eucalyptus and turpentine, Venetian turpentine, various rosins and balsams, sulfurized terpenes and rosins, hydrogenated rosin methyl ester, and synthetic resins. The essential oils, being inherently mixtures, may be used as the sole component of the organic decorating vehicle, but it will usually be preferably to employ them in conjunction with other materials. Lacquers can also be incorporated as a component of the organic decorating vehicle in decorating compositions of this invention. For decorating compositions formulated for high firing film deposition, higher molecular weight constituents such as the rosins and the synthetic resins are employed in the organic decorating vehicles inasmuch as these components are of sufficiently high viscosity at the high firing temperatures so as not to run or flow to ruin the decoration. However, the high temperatures of the firing will still remove or drive off the rosin or synthetic resin and the remainder of the decorating vehicle, which would not be affected at low firing temperatures, to leave the mettalic decorative film. For decorating compositions formulated for firing at low temperatures, lower molecular weight constituents such as two or more of the lower molecular weight ingredients previously disclosed would be used. The term "organic decorating vehicle" is used herein and in the appended claims to mean a vehicle composition containing two or more of the vehicle ingredients previously disclosed or two or more equivalents thereof.

In addition to the organic decorating vehicle, the decorating compositions of this invention may contain a flux for the silver when moderate and high temperature conditions are to be employed. The choice of the ingredients for the flux determines the behavior of the silver film during and after firing and is usually dictated by the composition of the article to be decorated and the use for which it is intended. The flux will usually contain small amounts of salts or resinates of rhodium or iridium to improve the continuity and brilliance of the silver film. Other ingredients such as salts and resinates of bismuth, chromium, lead, cadmium, tin, copper, cobalt, boron, antimony and uranium are employed to improve the adherence of the silver film and its resistance to abrasion. The ingredients fuse to a low melting glass or glaze and are well understood by those skilled in the art of compounding glazes and porcelain enamels. When the silver neocarboxylates are used in conjunction with other precious metals, fluxing may not be required for some applications, since silver has some inherent fluxing action in these combinations. The conventional glazes cannot be used to promote adherence of the silver film to non-refractory materials such as plastics, wood, paper and the like, and the silver film on such material usually will be protected by a coating of a lacquer or varnish, or by laminating a thin film of plastic to the surface.

While decorating compositions containing silver as the sole or principal precious metal component have many uses, decorating compositions that also contain gold, platinum and/or palladium are advantageous for some applications. Decorating compositions containing mixtures of gold and silver sulforesinates have been described, for example, by Chemnitius, Sprechsaal 60, 313 (1927). The colors of the metallic films produced from such compositions range from lemon gold to green gold to silvery with increasing ratios of silver to gold. The silver neocarboxylates may be used to replace the silver sulforesinates in such compositions containing gold sulforesinate, and the resultant decorating compositons are materially more reproducible than similar compositions containing silver sulforesinate. Similiarly, the silver neocarboxylates can advantageously be used to replace silver sulforesinate for varying the color of the metallic films obtained from burnish gold decorating compositions containing metallic gold powder. Neither the gold sulforesinate nor the metallic gold powder react with the silver neocarboxylates of this invention to form coordination compounds either at normal temperature or elevated temperature. In like manner, platinum or palladium sulforesinates or other organic compounds of platinum or palladium, for instance halogenoplatinous mercaptide-alkyl sulfide complexes, as described in Fitch U.S. Patent No. 3,022,177, and bisthioether palladous salt coordination compounds, as described in my copending U.S. patent application Ser. No. 60,575, filed Oct. 5, 1960, as well as metallic platinum powder or metallic palladium powder may be included in decorating compositions containing silver neocarboxylates to obtain specific colors or electrical properties in the metallic films obtained from them. Silver neocarboxylates may also be used as ingredients in decorating compositions containing metallic silver powder, which may be amorphous or in the form of flakes or spherules, to improve the electrical continuity and conductivity of the films obtained from such compositions and the ease with which they may be burnished.

Another type of decorating composition in which silver neocarboxylates may be used with advantage is designed to give luster colors on firing. Such compositions contain relatively less precious metal and more flux than compositions designed to give a conductive film, and they fire to non-conductive, translucent colored films having a characteristic sheen or luster. The colors produced are believed to result from the presence in the film of free metal in a colloidal form.

It is known that when silver films on glass are heated near the softening point of the glass, silver ions migrate into the surface of the glass to give yellow to amber permanent stains. Decorating compositions containing silver neocarboxylates may be employed to obtain such stains. The silver neocarboxylates may be employed in such compositions as the sole source of staining material, or they may be employed in conjunction with other glass staining materials such as compounds of copper.

The silver content of the decorating compositions of this invention may vary widely, depending upon the method of application and the effect desired. For example, luster decorating compositions for spraying may contain as little as 0.1 percent silver, whereas compositions to be applied by screening to obtain films having a high degree of solderability and electrical conductivity may contain 30 percent or more of silver.

Metallic films are produced when films of the decorating compositions of the invention are fired in the range of about 110–800° C., the optimum temperature depending upon the effect desired and the nature of the substrate. Bright silver mirrors are obtained when the preferred compositions containing a silver alkyl neocarboxylate containing from 10 to 40 carbon atoms are applied to a smooth substrate and fired in the range of about 110–300° C. Specular metallic films may be obtained at still higher temperatures when the composition also contains rhodium, iridium or other precious metal compounds. With substrates of relatively low thermal stability such as plastics, plastic laminates or paper, the firing temperature will be held as low as possible consistent with the development of a metallic film. When low temperature firing is desired, heating by infrared radiation is particularly advantageous, since the formation of a metallic film gives a heat reflective surface that tends to prevent overheating. Substrates which were decorated with metallic films at low firing temperatures between 125° C. and 160° C. by this invention included a polyamide plastic ("Nylon") film, silicone rubber panel, polyethylene terephthalate ("Mylar") film, polyethylene bottle, tetrafluoroethylene polymer ("Teflon") panel, fluorohalocarbon plastic ("Aclar 22C") panel, chlorinated polyether ("Penton") panel, vinyl plastic ("Tygon") tubing, polished cotton cloth swatch, silk cloth swatch, fiberglass woven cloth swatch, fir plywood panel, maple wooden block, polished low carbon steel panel, unpolished carbon steel panel, copper panel, brass panel, polymethylmethacrylate ("Plexiglas") panel, melamine plastic dish, epoxy plastic-fiberglass laminated ("Continental Diamond GB28E") panel, silicone plastic-fiberglass laminated ("Formica G-7") panel, phenolic plastic-paper laminated panel, clear mica panel, clear window glass panel, soda lime glass tumbler, glazed ceramic tile and porcelain enameled steel panel. For refractory substrates such as porcelain or glazed ceramics, temperatures of the order of about 500–800° C. will be employed to obtain maximum adherence, conductivity and solderability. Refractory substrates which were decorated with metallic films at temperatures between 500° C. and 800° C. by this invention included a fused quartz panel, fused quartz tube, a tempered soda lime opal glass dish, soda lime glass tumbler, borosilicate glass bottle, black glazed ceramic tile, alumina ceramic tube and titania ceramic tube. Unless staining is desired or precious metals other than silver are also present in the decorating composition, glassy substrates will usually be fired somewhat below their softening points, which may vary from about 500° C. for a soft glass to 800° C. or higher for a hard glaze or porcelain. In every case, the firing is carried out for a time sufficient to decompose the silver neocarboxylate and volatilize the non-metallic decomposition products.

The invention will be further illustrated by reference to the following examples. Where kiln firing is specified it is to be understood the pieces were placed at ambient temperature in a kiln which was then heated to a specified temperature and slowly cooled, the total operation requiring an hour or more. The melting and decomposition points given in Examples 1 and 2 were obtained in capillary tubes heated at a rate of about 5° C. per minute. Parts and percentages are by weight in all examples.

EXAMPLE 1

*Preparation of silver neocarboxylates from a neocarboxylic acid and silver nitrate*

Deionized water was used throughout the preparation and washing. To 51.55 parts of a commercial grade of neoheptanoic acid consisting mainly of 2,2-dimethylvaleric acid in 400 parts water was added 218 parts 2 N sodium hydroxide solution. To the resulting slightly turbid solution was added a solution of 67.96 parts silver nitrate in 100 parts water with stirring at 30–32° C. during 25 minutes. A voluminous snow-white precipitate formed during the addition. After stirring for 15 minutes, the mixture was diluted with 198 parts acetone, stirred for 15 minutes longer and filtered on a Buechner funnel. The precipitate was washed on the filter with a mixture of 198 parts acetone and 250 parts water and then with 198 parts acetone and was air-dried at room temperature protected from direct light. The product was 90.15 parts of a slightly off-white solid containing 45.56 percent silver that darkens and sinters between 220 and 230° C. and melts with decomposition ca. 250° C.

In a similar manner but employing pivalic, 2,2-diphenylbutyric, triphenylacetic and alpha, alphadimethylphenylacetic acid respectively were prepared silver neopentanoate (a slightly off-white solid containing 51.88 percent silver that darkens and sinters between 235 and 250° C. but does not melt to 260° C.), silver 2,2-diphenylbutyrate (after crystallization from a large volume of toluene obtained as white crystals containing 30.60 percent silver that darken ca. 155° C. and melt with decomposition at 205–210° C.), silver triphenylacetate (a slightly off-white solid containing 28.42 percent silver that darken ca. 190° C. and melts with decomposition between 202 and 205° C.) and silver alpha,alpha-dimethylphenylacetate (after crystallization from a large volume of toluene obtained as white crystals containing 40.74 percent silver that darken ca. 190° C. and melt with decomposition between 204 and 206° C.).

EXAMPLE 2

*Preparation of silver neocarboxylates from a neocarboxylic acid and silver oxide*

To a stirred solution of 87.9 parts of a commercial grade of neotridecanoic acid (a complex mixture of branched chain neotridecanoic acids) in 43 parts toluene was added 48.7 parts silver oxide. A mildly exothermic reaction occurred. The mixture was stirred and heated to 100° C. during 15 minutes (water evolved between 90 and 100° C.) and at about 100° C. for 15 minutes and was filtered hot through a thin layer of diatomaceous earth on a Buechner funnel to remove excess silver oxide, using toluene as needed to thin the mixture and rinse the filter. The filtrate was 187.4 parts clear amber liquid. This filtrate was heated in an open dish on the steam bath until 154.9 parts moderately viscous dark amber liquid remained containing 27.84 percent silver. This was further diluted with toluene to give 179.6 parts fluid dark amber liquid containing 24 percent silver. A toluene solution of silver neodecanoate containing 24 percent silver was prepared in a similar manner from a commercial grade of neodecanoic acid.

To a solution of 11.31 parts 2,2-diphenylpropionic acid in 172 parts toluene was added 6.95 parts silver oxide with stirring. A white precipitate formed. The mixture was stirred at gentle reflux and additional toluene (1200 parts) added to just dissolve the white precipitate, and the mixture was filtered hot to remove excess silver oxide. Voluminous, feathery white needles formed in the filtrate, on cooling. After dilution with 790 parts methanol and cooling to about 10° C., the mixture was filtered on a Buechner funnel. The precipitate was washed on the filter with 160 parts methanol and air dried at room temperature, giving 15.09 parts voluminous snow-white needles containing 32.15 percent silver that darken ca. 185° C. and melt with decomposition between 225 and 228° C. In a similar manner but employing triethylacetic, 2-ethyl-2-methylcaproic and 2,2-dimethylbutyric acid respectively were prepared silver triethylacetate (white needles containing 42.95 percent silver that darken ca. 220° C. and decompose without melting ca. 240° C.), silver 2-ethyl-2-methylcaproate (white crystals containing 40.85 percent silver that darken ca. 170° C. and melt with decomposition ca. 178° C.) and silver 2,2-dimethylbutyrate (white needles containing 48.54 percent silver that decompose without melting between 225 and 235° C.).

EXAMPLE 3

*Decorating compositions containing silver neodecanoate*

A decorating composition suitable for low-temperature firing was prepared by mixing 40 parts of a solution of silver neodecanoate in toluene (24 percent Ag), 4 parts Venetian turpentine, 4 parts oil of peppermint and 32 parts toluene to give a clear solution containing 12 percent silver. This was applied as a decorative design by brushing onto a soda lime glass panel, a phenolic plastic-paper laminate panel and a thin film of a polyethylene terephthalate plastic known as "Mylar." After firing for one hour in a mechanical convection oven at 150° C. bright, specular silvery films were obtained in each instance. The films on glass and "Mylar" when viewed on the reverse side through the substrate were particularly brilliant and comparable in appearance to high quality mirrors obtained by chemical reduction of silver salts.

A fluxed decorating composition suitable for high-temperature firing was prepared by mixing 417 parts of a solution of silver neodecanoate in toluene (24 percent Ag), 100 parts of a solution of rhodium resinate in a mixture of essential oils and hydrocarbons (1 percent Rh), 30 parts of a solution of bismuth resinate in a mixture of essential oils (4.5 percent Bi), 10 parts of a solution of chromium resinate (2.05 percent Cr) in a mixture of cyclohexanone and oil of turpentine, 200 parts of a 50 percent solution of rosin in turpentine, and 243 parts toluene to give a clear solution containing 10 percent silver, 0.1 percent rhodium, 0.14 percent bismuth and 0.02 percent chromium. This was applied as a decorative design by brushing onto a soda lime glass panel, which was kiln fired to 500° C. A conductive, bright, specular silver film was obtained.

EXAMPLE 4

*Decorating compositions containing silver neotridecanoate*

(A) A fluxed decorating composition suitable for brushing was prepared by mixing 417 parts of a solution of silver neotridecanoate in toluene (24 percent Ag), 100 parts of a solution of rhodium resinate in a mixture of essential oils and hydrocarbons (1 percent Rh), 30 parts of a solution of bismuth resinate in a mixture of essential oils (4.5 percent Bi), 10 parts of a solution of chromium resinate in a mixture of cyclohexanone and oil of turpentine (2.05 percent Cr), 200 parts of a 50 percent solution of rosin in turpentine, and 243 parts toluene to give a clear solution containing 10 percent silver, 0.1 percent rhodium, 0.14 percent bismuth and 0.02 percent chromium. This was applied as a decorative design by brushing onto a soda lime glass panel, which was kiln fired to 280° C. A bright, specular, conductive silvery film was obtained.

(B) An unfluxed decorating composition suitable for stamping was prepared by heating a mixture of 2 parts of a solution of silver neotridecanoate in toluene (24 percent Ag) and 2 parts of a 35 percent solution of rosin in terpineol on a steam bath until one part had evaporated, leaving 3 parts of a viscous oil containing 16 percent silver. This was rolled thin on a glass plate and transferred by means of a rubber stamp in a decorative design onto a soda lime glass tumbler, which was kiln fired to 250° C. A bright, conductive, specular silvery film was obtained. The same composition was stamped in the same manner onto a dish made of a glass ceramic known as "Pyroceram," onto a hard porcelain dish and onto a glazed earthenware tile, each of which was kiln fired to 740° C. In each case a matte, light grey film was obtained that burnished to a conductive, bright silvery film.

(C) An unfluxed thermoplastic decorating composition suitable for hot screening was prepared by heating a mixture of 10 parts of a solution of silver neotridecanoate in toluene (24 percent Ag), 5 parts of a mixture of primary amides of fatty acids known as "Armid HT," 2 parts stearic acid and 2 parts hydrogenated rosin methyl ester in an open dish on a steam bath under an infrared lamp until 3 parts had evaporated leaving 16 parts of a clear solution that contained 15 percent silver and set to a solid on cooling. This was applied as a decorative design by screening through a 250 mesh stainless steel screen maintained at about 107° C. onto a soda lime glass tumbler. The applied film immediately set to a hard, tack-free condition upon application to the tumbler, which was maintained at room temperature. On kiln firing the tumbler to 600° C., the design appeared as a matte, pale grey film that burnished to a lustrous, conductive silvery film.

(D) An unfluxed decorating composition suitable for brushing was prepared by mixing 200 parts of a solution of silver neotridecanoate in toluene (24 percent Ag), 195 parts toluene, 100 parts chloroform, 100 parts cyclohexanone and 5 parts oil soluble red dye to give a clear red solution containing 8 percent silver. This was applied as a decorative design by brushing onto a soda lime glass panel, which was heated for 15 minutes at a distance of 6.5 inches from a 3000 watt infrared heater. A conductive, semi-bright silvery film was obtained. An identical panel heated on a hot plate for 90 minutes at 115 to 120° C. gave a matte film that was bright and specular on the reverse side.

EXAMPLE 5

*Decorating composition containing silver neopentanoate*

A mixture of 50 parts silver neopentanoate (51.88 percent Ag), 3 parts of a solution of a bismuth soap in toluene (26.9 percent Bi), 2 parts of a solution of a lead soap in toluene (27.8 percent Pb), 19 parts butyl oxalate and 30 parts hydrogenated rosin methyl ester was passed twice through a roll mill to give a smooth paste containing 25 percent silver, 0.78 percent bismuth and 0.53 percent lead. This was applied as a decorative design by screening through a 230 mesh Nitex screen onto a glazed ceramic tile, which was kiln fired to 740° C., and onto a soda lime glass panel, which was kiln fired to 600° C. In each case a conductive, matte silvery film was obtained that burnished to a bright, lustrous silvery film. Twenty parts of the same composition was mixed with 5 parts oil of eucalyptus and 5 parts dibutyl itaconate to give a suspension containing 16.65 percent silver, 0.52 part bismuth and 0.36 part lead. This was applied by brushing onto a soda lime glass panel, which was kiln fired to 600° C. A

EXAMPLE 6

*Decorating composition containing silver 2,2-dimethylbutyrate*

A mixture of 400 parts silver 2,2-dimethylbutyrate (48.54 percent Ag), 40 parts of a solution of a bismuth soap in toluene (26.9 percent Bi) and 530 parts terpineol was passed twice through a roll mill to give a smooth paste that was mixed with 485 parts oil of lavender to give a suspension containing 13.3 percent silver and 0.74 percent bismuth. This was applied by brushing onto a soda lime glass panel, which was kiln fired to 600° C. A conductive, matte silvery film was obtained that burnished bright and lustrous.

EXAMPLE 7

*Decorating composition containing silver neoheptanoate*

A mixture of 50 parts silver neoheptanoate (45.56 percent Ag), 5 parts lead metaborate (66.8 percent Pb, 3.45 percent B), 30 parts of a pentaerythritol ester known as "Hercoflex 600" and 29 parts of cyclohexanone was passed twice through a roll mill to give a smooth paste containing 20 percent silver, 2.92 percent lead and 0.14 percent boron. This was applied as a decorative design by screening through a 230 mesh Nitex screen onto a soda lime glass panel, which was kiln fired to 600° C. A conductive, very hard, matte silvery film was obtained that gave a bright lustrous film on burnishing with an agate burnisher. Twenty parts of the same composition was mixed with 10 parts dipentene oxide to give a suspension containing 13.3 percent silver, 1.95 percent lead and 0.076 percent boron. This was applied by brushing onto a soda lime glass panel, which was kiln fired to 600° C. A conductive, very hard, matte silvery film was obtained that gave a bright lustrous film when burnished with an agate burnisher.

EXAMPLE 8

*Decorating composition containing silver triethylacetate*

A mixture of 80 parts silver triethylacetate (42.95 percent Ag), 4 parts lead fluoride (84.6 percent Pb) and 88 parts dibutyl phthalate was passed twice through a roll mill to give a smooth paste that was mixed with 43 parts toluene and 43 parts mineral spirits to give a suspension containing 13.3 percent silver and 1.31 percent lead. This was applied by brushing onto a soda lime glass panel, which was kiln fired to 600° C. A conductive, matte silvery film was obtained that burnished bright and lustrous.

EXAMPLE 9

*Decorating composition containing silver 2-ethyl-2-methylcaproate*

A mixture of 20 parts silver 2-ethyl-2-methylcaproate (40.85 percent Ag), 1 part bismuth subnitrate (35.7 percent Bi), 1 part lead metaborate (66.8 percent Pb, 3.45 percent B), 10 parts Venetian turpentine, 5 parts butyl carbitol acetate and 5 parts benzyl benzoate was passed twice through a roll mill to give a smooth paste containing 19.4 percent silver, 0.85 percent bismuth, 1.59 percent lead and 0.082 percent boron. This was applied as a decorative design by screening through a 230 mesh Nitex screen onto a soda lime glass panel, which was kiln fired to 500° C. The design appeared as a conductive, matte silvery film that was bright and lustrous after burnishing.

EXAMPLE 10

*Decorating composition containing silver alpha,alpha-dimethylphenylacetate*

A mixture of 80 parts silver alpha,alpha-dimethylphenylacetate (40.74 percent Ag), 8 parts of a solution of a copper soap in a mixture of cyclohexanone and toluene (6.4 percent Cu) and 44 parts pine oil was passed twice through a roll mill to give a smooth paste that was mixed with 33 parts oil of camphor and 33 parts chloroform to give a suspension containing 16.5 percent silver and 0.26 percent copper. This was applied by brushing onto a soda lime glass panel, which was kiln fired to 600° C. A conductive, matte silvery film was obtained that burnished bright and lustrous.

EXAMPLE 11

*Decorating composition containing silver 2,2-diphenylpropionate*

A mixture of 4 parts silver 2,2-diphenylpropionate (32.15 percent Ag), 2 parts bismuth subnitrate (35.7 percent Bi) and 44 parts cyclohexanol was passed twice through a roll mill to give a smooth paste that was mixed with 43 parts oil of turpentine to give a suspension containing 10 percent silver and 0.55 percent bismuth. This was applied by brushing onto a soda lime glass panel, which was kiln fired to 600° C. A conductive, matte, silvery film was obtained that burnished bright and lustrous.

EXAMPLE 12

*Decorating composition containing silver 2,2-diphenylbutyrate*

A mixture of 80 parts silver 2,2-diphenylbutyrate (30.60 percent Ag), 4 parts boric acid (17.5 percent B) and 80 parts of an epoxidized soya bean oil known as "Paraplex G-62" was passed twice through a roll mill to give a smooth paste that was mixed with 41 parts dioxane and 41 parts oil of copaiba to give a suspension containing 9.95 percent silver and 0.28 percent boron. This was brushed onto a soda lime glass panel, which was kiln fired to 600° C. A conductive, matte silvery film was obtained that was bright and lustrous after burnishing.

EXAMPLE 13

*Decorating composition containing silver triphenylacetate*

A mixture of 80 parts silver triphenylacetate (28.42 percent Ag), 16 parts of a solution of a chromium soap in toluene (9.6 percent Cr) and 92 parts hydrogenated rosin methyl ester was passed twice through a roll mill to give a smooth paste that was mixed with 47 parts oil of spike and 47 parts oil of rosemary to give a suspension containing 8.06 percent silver and 0.54 percent chromium. This was brushed onto a soda lime glass panel, which was kiln fired to 500° C. A matte silvery film was obtained that burnished bright and lustrous.

EXAMPLE 14

*Decorating compositions containing silver neotridecanoate and a gold sulforesinate*

(A) A lemon gold decorating composition suitable for brushing was prepared by mixing 290 parts of a solution of silver neotridecanoate in toluene (24 percent Ag), 600 parts of a solution of gold sulforesinate in a mixture of essential oils (24 percent Au), 48 parts of a solution of rhodium resinate in a mixture of essential oils and hydrocarbons (5 percent Rh), 92 parts anethole, 35 parts benzyl acetate, 100 parts mineral spirits and 35 parts toluene to give 1200 parts of a clear solution containing 12.0 percent gold, 5.8 percent silver and 0.2 percent rhodium. This was applied as a decorative design by brushing onto a glazed earthenware saucer, which was kiln fired to 740° C. A semi-bright, metallic, conductive, golden yellow film was obtained. The same solution was applied as a decorative design by brushing onto a porcelain plate, which was kiln fired to 800° C. A metallic, conductive film was obtained that was bright golden yellow after light burnishing to remove surface scum.

(B) A luster decorating composition suitable for brushing was prepared by mixing 100 parts of a solution of silver neotridecanoate in toluene (24 percent Ag), 90 parts of a solution of gold sulforesinate in a mixture of essential oils (24 percent Au), 120 parts of a solution of silicon alcoholate in a mixture of essential oils (9.35 percent Si), 265 parts of a solution of zinc resinate in a mixture of essential oils (3.64 percent Zn), 200 parts of a solution of calcium resinate in a mixture of essential oils (1.43 percent Ca), 35 parts rosin, 223 parts oil of rosemary, 83 parts benzyl acetate, 42 parts chloroform and 42 parts toluene to give 1200 parts of a clear solution containing 2 percent silver, 1.8 percent gold, 0.94 percent silicon, 0.80 percent zinc and 0.24 percent calcium. This was applied by brushing onto a soda lime glass tumbler, which was kiln fired to 600° C., giving a bright orange film with a golden sheen.

Another luster decorating composition was prepared by mixing 10 parts of a solution of silver neotridecanoate in toluene (24 percent silver), 18 parts of a solution of gold sulforesinate in a mixture of essential oils (24 percent Au), 32 parts of a solution of bismuth resinate in a mixture of essential oils and benzyl acetate (4.5 percent Bi), 26 parts of silicon alcoholate in a mixture of essential oils and benzyl acetate (7 percent Si), 17 parts terpineol and 17 parts chloroform to give 120 parts of a clear solution containing 2 percent silver, 3.6 percent gold, 1.2 percent bismuth and 1.52 percent silicon. This was applied by brushing onto a soda lime glass tumbler, which was kiln fired to 600° C., giving a bright, deep ruby film with a golden sheen.

EXAMPLE 15

*Decorating composition containing silver neotridecanoate and metallic gold powder*

A burnish lemon gold decorating composition suitable for brushing was prepared by passing a mixture of 10 parts brown metallic gold powder (99.1 percent Au), 1 part bismuth subnitrate (71.5 percent Bi) and 10 parts of a 35 percent solution of rosin in terpineol twice through a roll mill and mixing the resulting paste with 84 parts of the composition of Example 14(A) to give 105 parts of a suspension containing 19 percent gold, 4.65 percent silver, 0.16 percent rhodium and 0.68 percent bismuth. This was applied as a decorative design by brushing onto a glazed earthenware saucer, which was kiln fired to 740° C., and onto a porcelain ("hard china") dish, which was kiln fired to 800° C. In each case a matte, golden film was obtained that gave a semi-bright lustrous golden yellow film on burnishing.

EXAMPLE 16

*Decorating compositions containing silver neotridecanoate and an organic platinum compound*

(A) A decorating composition suitable for brushing was prepared by mixing 20 parts of a solution of silver neotridecanoate in toluene (24 percent Ag), 100 parts of a solution of platinum sulforesinate in a mixture of essential oils (12 percent Pt), 10 parts of a solution of rhodium resinate in a mixture of essential oils and hydrocarbons (1 percent Rh), 24 parts of a solution of bismuth resinate in a mixture of essential oils (4.5 percent Bi), 4 parts of a solution of chromium resinate in a mixture of cyclohexanone and oil of turpentine (2.05 percent Cr), 1 part of a solution of tin resinate in a mixture of essential oils (3.15 percent Sn), 41 parts of a 50 percent solution of rosin in turpentine, and 40 parts oil of rosemary to give a clear solution containing 2 percent silver, 5 percent platinum, 0.042 percent rhodium, 0.45 percent bismuth, 0.034 percent chromium and 0.013 percent tin. This solution was applied as a decorative design by brushing onto a glazed earthenware tile, which was kiln fired to 740° C. A conductive, metallic silvery film was obtained having a slight surface scum which was readily removed by light burnishing to give a specular silvery film.

(B) A decorating composition suitable for brushing was prepared by mixing 20 parts of a solution of silver neotridecanoate in toluene (24 percent Ag), 40 parts of a solution of chloroplatinous isooctyloxycarbonylmethylmercaptide-methyl sulfide complex in toluene (30 percent Pt), 10 parts of a solution of rhodium resinate in a mixture of essential oils and hydrocarbons (1 percent Rh), 24 parts of a solution of bismuth resinate in a mixture of essential oils, 4 parts of a solution of chromium resinate in a mixture of cyclohexanone and oil of turpentine (2.05 percent Cr), 1 part of a solution of tin resinate in a mixture of essential oils (3.15 percent Sn), 81 parts of a 50 percent solution of rosin in turpentine, and 60 parts oil of rosemary to give a slightly turbid solution containing the same percentages of metals as in (A) above. This solution was applied as a decorative design by brushing onto a soda lime glass tumbler, which was kiln fired to 600° C., and onto a glazed earthenware tile, which was kiln fired to 740° C. A slightly scummed film was obtained on the tumbler that gave on washing a bright, specular, conductive, silvery film. A similar film was obtained on the tile after light burnishing to remove surface scum.

EXAMPLE 17

*Decorating composition containing silver neotridecanoate and metallic platinum powder*

A mixture of 50 parts of a solution of silver neotridecanoate in toluene (24 percent Ag), 50 parts metallic platinum powder (98.7 percent Pt), 5 parts bismuth subnitrate and 50 parts hydrogenated rosin methyl ester was passed twice through a roll mill to give a smooth paste containing 7.74 percent silver, 31.8 percent platinum and 2.3 percent bismuth. This was thinned to brushing consistency with oil of turpentine and applied by brushing onto a soda lime glass tumbler, which was kiln fired to 600° C., and onto a glazed earthenware tile, which was kiln fired to 740° C. In each case, matte grey films were obtained that were conductive and readily solderable and burnished to lustrous silvery films.

EXAMPLE 18

*Decorating compositions containing silver neotridecanoate and an organic palladium compound*

(A) A decorating composition was prepared by mixing 3 parts of a solution of silver neotridecanoate in toluene (24 percent Ag), 7 parts of a solution of palladium sulforesinate in a mixture of essential oils (9 percent Pd), 2 parts toluene and 2 parts oil of rosemary to give a clear solution containing 5.14 percent silver and 4.5 percent palladium. This was applied as a decorative design by brushing onto a soda lime glass tumbler, which was kiln fired to 600° C., and onto a glazed earthenware tile, which was kiln fired to 740° C. In each case, bright, silvery-brown, conductive films were obtained.

(B) A decorating composition was prepared by mixing 30 parts of a solution of silver neotridecanoate in toluene (24 percent Ag), 32 parts of a solution of dichlorobis-di-n-butylsulfidepalladium(II) in toluene (20 percent Pd), 20 parts of a 50 percent solution of rosin in turpentine, 38 parts oil of rosemary and 20 parts toluene to give a turbid solution containing 5.16 percent silver and 4.58 percent palladium. This was applied as a decorative design by brushing onto a soda lime glass tumbler, which was kiln fired to 600° C., and onto a glazed earthenware tile, which was kiln fired to 740° C. In each case, silverybrown, conductive films were obtained, the film on the tile being bright as removed from the kiln, and the film on the tumbler being bright after removing a little surface scum by washing.

EXAMPLE 19

*Decorating compositions containing silver neotridecanoate and metallic palladium powder*

(A) A decorating composition suitable for screening was prepared by passing a mixture of 50 parts of a toluene solution of silver neotridecanoate (24 percent Ag), 50 parts metallic palladium powder (97.4 percent Pd), 5 parts bismuth subnitrate and 50 parts hydrogenated rosin methyl ester twice through a roll mill to give a smooth paste containing 7.74 percent silver, 31.4 percent palladium and 2.31 percent bismuth. This was applied in the design of an electric circuit by screening through a 196 mesh Nitex screen onto a sintered alumina disk, which was kiln fired to 800° C. A dark grey, conductive film was obtained.

(B) The composition of (A) above was thinned to brushing consistency with oil of turpentine and applied as a decorative design by brushing onto a soda lime glass tumbler, which was kiln fired to 600° C., and onto a glazed ceramic tile, which was kiln fired to 740° C. In each case matte reddish-brown films were obtained that were moderately conductive.

EXAMPLE 20

*Decorating composition containing silver neotridecanoate and metallic silver powder*

(A) A decorating composition suitable for machine banding was prepared by passing a mixture of 50 parts of a solution of silver neotridecanoate in toluene (24 percent Ag), 50 parts of metallic silver flake powder, 5 parts bismuth subnitrate and 50 parts hydrogenated rosin methyl ester twice through a roll mill to give a smooth paste containing 40 percent silver and 2.31 percent bismuth. This was applied as a decorative band by machine banding onto a soda lime glass tumbler, which was kiln fired to 600° C. A matte, pale grey film was obtained that burnished to a lustrous, conductive silvery film.

(B) The composition of (A) above was thinned to brushing consistency with oil of turpentine and applied as a decorative design by brushing onto a soda lime glass tumbler, which was kiln fired to 600° C., and onto a glazed earthenware tile, which was kiln fired to 740° C. In each case a matte pale grey film was obtained that burnished to a lustrous conductive silvery film that was readily solderable.

EXAMPLE 21

*Decorating composition containing silver neotridecanoate and an organic copper compound*

A stain decorating composition was prepared by mixing 1 part of a toluene solution of silver neotridecanoate (24 percent Ag), 3 parts of a solution of a copper soap in mineral spirits (8 percent Cu), 2 parts of a 50 percent solution of rosin in turpentine and 2 parts toluene to give a clear solution containing 3 percent silver and 3 percent copper. This was applied as a decorative design by brushing onto a soda lime glass tumbler, which was kiln fired to 620° C. The design appeared as an amber brown, permanent stain.

What is claimed is:

1. A decorating composition comprising a silver neocarboxylate having the formula

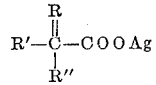

wherein R, R' and R" are alkyl radicals, said silver neocarboxylate having from 10 to 40 carbon atoms in the molecule, dissolved in an organic decorating vehicle comprising two or more solvents.

2. The decorating composition of claim 1 further characterized in containing metallic gold, silver, platinum or palladium powder as an additional constituent.

3. The decorating composition of claim 1 further characterized in containing a sulforesinate of gold, palladium or platinum as an additional constituent.

4. A decorating composition comprising a silver neocarboxylate having the formula

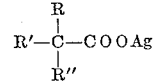

wherein R, R' and R" are alkyl radicals, said silver neocarboxylate having from 10 to 40 carbon atoms in the molecule, dissolved in an organic decorating vehicle comprising two or more solvents, and a silver flux.

5. The decorating composition of claim 4 wherein the silver neocarboxylate is silver neotrideconoate.

6. The decorating composition of claim 4 wherein the silver neocarboxylate is silver neodeconate.

7. The method for decorating an article with a silver-containing metallic film which comprises applying to the article to be decorated the decorating composition of claim 1 and firing the applied composition to a metallic film.

8. The method of decorating an article with a silver-containing metallic film which comprises applying to the article to be decorated the decorating composition of claim 4 and firing the applied composition to a metallic film.

References Cited

UNITED STATES PATENTS

| | | | |
|---|---|---|---|
| 1,741,477 | 12/1929 | Pfiffner | 117—160 |
| 2,511,472 | 6/1950 | Kmecik | 117—160 |
| 2,596,631 | 5/1952 | Whitacre et al. | 260—430 |
| 2,630,444 | 3/1953 | Fugassi | 260—430 |
| 2,773,844 | 12/1956 | Carlson et al. | 117—123 X |
| 2,955,949 | 10/1960 | Kirschenbaum et al. | 260—414 X |
| 3,163,665 | 12/1964 | Fitch | 117—123 X |

OTHER REFERENCES

Matthews et al.: Analytic Chemistry, vol. 22, No. 4, April 1950, pp. 514–519.

ALFRED L. LEAVITT, *Primary Examiner.*

RICHARD D. NEVIUS, RALPH S. KENDALL,
*Examiners.*